United States Patent [19]

Fortman et al.

[11] Patent Number: 4,557,739
[45] Date of Patent: Dec. 10, 1985

[54] SWEEPER WITH PRECLEANER AND/OR DEMISTER

[75] Inventors: Lloyd D. Fortman, Minneapolis; Mark D. Kinter, Spring Park, both of Minn.

[73] Assignee: Tennant-Company, Minneapolis, Minn.

[21] Appl. No.: 644,626

[22] Filed: Aug. 27, 1984

[51] Int. Cl.[4] .............................................. B01D 50/00
[52] U.S. Cl. ...................................... 55/320; 55/444; 55/446
[58] Field of Search ............... 15/340, 347, 349; 55/1, 55/257 Q, 257 PP, 320, 442–446

[56] References Cited

U.S. PATENT DOCUMENTS

| 675,276 | 5/1901 | Hanson | 55/446 |
|---|---|---|---|
| 846,034 | 3/1907 | Kieley et al. | 55/446 |
| 2,292,665 | 8/1942 | Schneible | 55/442 X |
| 3,221,358 | 12/1965 | Dickson | 15/340 |
| 3,304,572 | 2/1967 | Wendel | 15/340 |
| 3,744,222 | 7/1973 | DeLao | 55/446 |
| 4,113,454 | 9/1978 | Cuacho | 55/320 X |
| 4,156,406 | 5/1979 | Brandau et al. | 55/445 X |
| 4,206,530 | 6/1980 | Kroll et al. | 15/340 |
| 4,373,227 | 2/1983 | Kimzey et al. | 15/347 |

OTHER PUBLICATIONS

Brochure entitled "250 Power Sweeper" of the Tennant Company ©1981.
P. 18–12, chapter entitled "Environmental Control" from Mark's *Standard Handbook for Mechanical Engineers*, 8th Ed., ©1978.
Chapter entitled "Inertial Impactors" from *Aerosol Measurement*, Dale A. Lundgren et al., editors, ©1979.

*Primary Examiner*—Charles Hart
*Attorney, Agent, or Firm*—Kinzer, Plyer, Dorn & McEachran

[57] ABSTRACT

This is concerned with a sweeper of the type that has a power operated brush that sweeps debris off of a floor or other surface to be cleaned and throws it into a hopper with a vacuum fan arranged to draw air from the hopper through a filter and exhaust it to the atmosphere. More particularly, the sweeper is provided with a precleaner and/or demister which separates the larger particles, and possibly moisture, from the airstream as it moves through the hopper, thereby protecting and/or aiding the filter.

16 Claims, 7 Drawing Figures

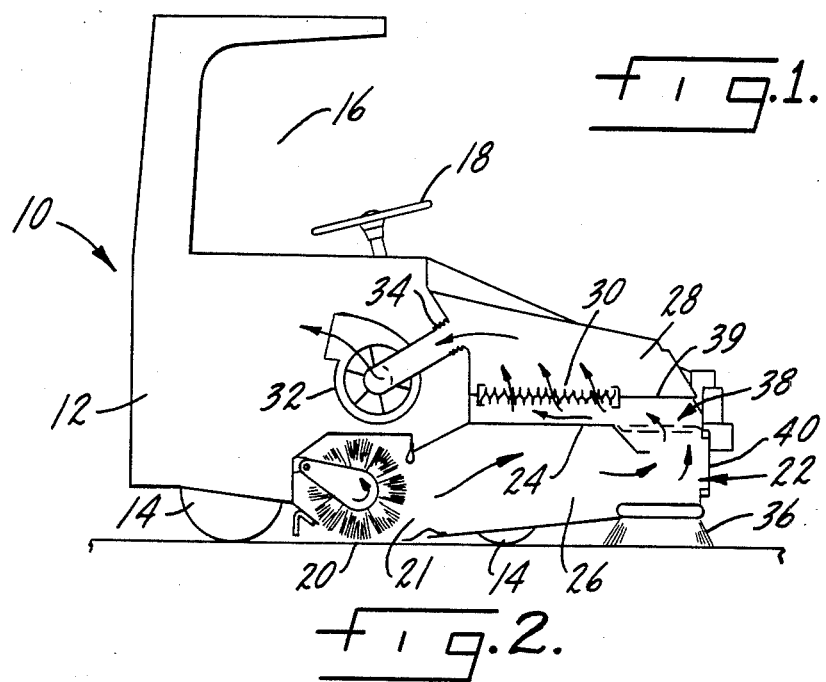
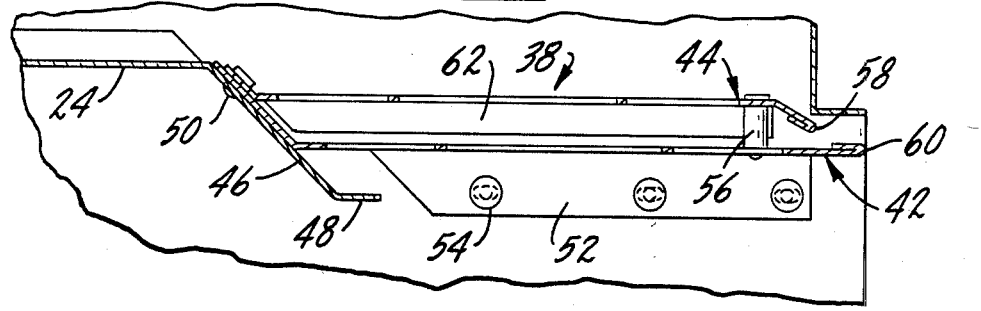
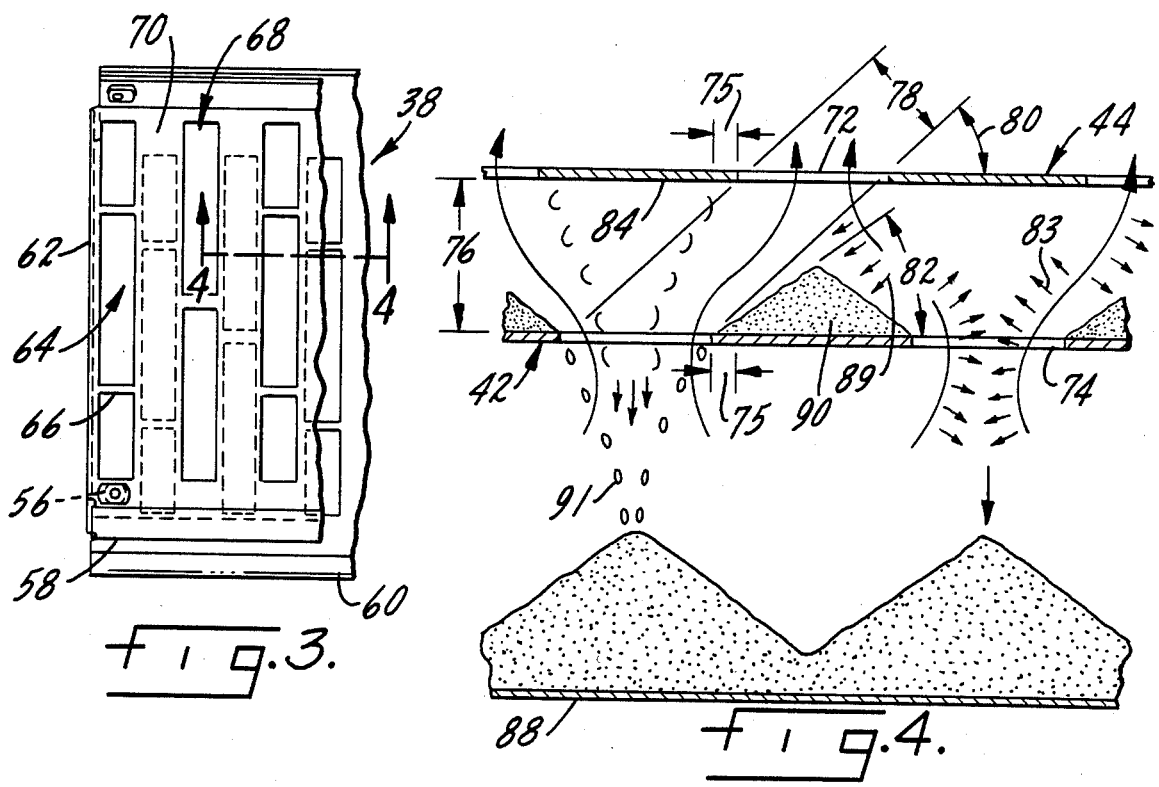

SWEEPER WITH PRECLEANER AND/OR DEMISTER

SUMMARY OF THE INVENTION

This invention is concerned with a sweeper of the type that may be power operated and has a brush for sweeping material from a surface to be cleaned which propels debris off of the surface and throws it into a hopper, all of which is normally mounted on a frame which may be either self-propelled or possibly a walk behind unit.

A primary object of the invention is a sweeper of the general type discussed above which has a precleaner to remove large particles, such as dust, dirt and moisture from the air before or ahead of the filter unit in the sweeper.

Another object is a sweeper of the above type with a hopper that receives debris from the main brush with the hopper being in two chambers, the first being a debris chamber and the second being a filter chamber, with a precleaner or moisture separator between the chambers.

Another object is a sweeper of the above type which uses an air filter and is constructed and arranged to protect the filter against moisture.

Another object is a sweeper of the above type which creates a very low restriction in the airflow to the filter and vacuum fan.

Another object is a sweeper of the above type constructed and arranged to prevent small pieces of paper from getting into the filter element or filter compartment.

Another object is a sweeper of the above type which may be either a low dump or a high dump unit.

Another object is a high dump unit of the above type in which the filter chamber empties more completely when dumping.

Another object is a sweeper of the above type which has a large opening between the two chambers in the hopper, thereby avoiding any restriction in the airflow.

Another object is a sweeper of the above type which has a large opening between the two filter chambers in the hopper, thereby avoiding any restriction in the airflow.

Another object is a precleaner for a sweeper of the above type which operates on low air velocity.

Another object is a precleaner for a sweeper of the above type which operates on reduced air velocity and inertial separation.

Another object is a specific geometry for a sweeper hopper of the above type including a precleaner.

Another object is a precleaner for a unit of the above type which creates or causes a pressure drop of only about 0.1 inches of water which is negligible.

Another object is a precleaning arrangement for a sweeper of the above type which has no moving parts.

Another object is a sweeper of the above type which reduces or eliminates service problems.

Another object is a sweeper of the above type which demists or removes water from the air before it flows through the filter.

Another object is a sweeper of the above type which gives more even distribution of the air going through the filter element.

Another object is a sweeper of the above type which provides a larger opening so that accumulated dust in the filter chamber may flow out when the hopper is rolled forward for dumping in a high dump unit.

Another object is a precleaner for a sweeper of the above type which relies upon reduced instead of increased air velocity.

Another object is a precleaner in a sweeper of the above type which achieves a balance between gravity and inertial separation.

Another object is a precleaner of the above type which operates with a reduced airflow velocity, for example, 10 feet/second or less.

Another object is a precleaner in a sweeper of the above type which needs only low precision parts and does not require high accuracy in components, parts, spacing, dimensions, etc.

Another object is a precleaner in a sweeper of the above type which combines inertial separation with gravity settling ahead of the conventional filter.

Another object is a demister or water droplet separator for a sweeper of the above type which operates or is based on the principle of inertial separation.

Another object is the locating of a precleaner of the above type to provide a turning movement in the airflow of at least 90° through the precleaner and, in some cases, almost or on the order of 180°.

Another object is a precleaner and a sweeper of the above type which provides better airflow distribution to the filter.

Another object is a method of separating dust and dirt from an airstream.

Another object is a sweeper of the above type with a precleaner which reduces dust loading to the filter thereby allowing longer periods between filter cleanings which greatly increases productivity of the unit and also reduces the wear and tear on the filter shaker.

Other objects will appear from time to time in the ensuing specification and drawings.

BRIEF DESCRIPTION OF THE DRAWINGS

FIG. 1 is a schematic view of a forward throw sweeper embodying the invention.

FIG. 2 is an enlargement of a portion of FIG. 1.

FIG. 3 is a top view of a part of FIG. 2.

FIG. 4 is a section on an enlarged scale along line 4—4 of FIG. 3.

BRIEF DESCRIPTION OF THE PREFERRED EMBODIMENT

Figure 5:
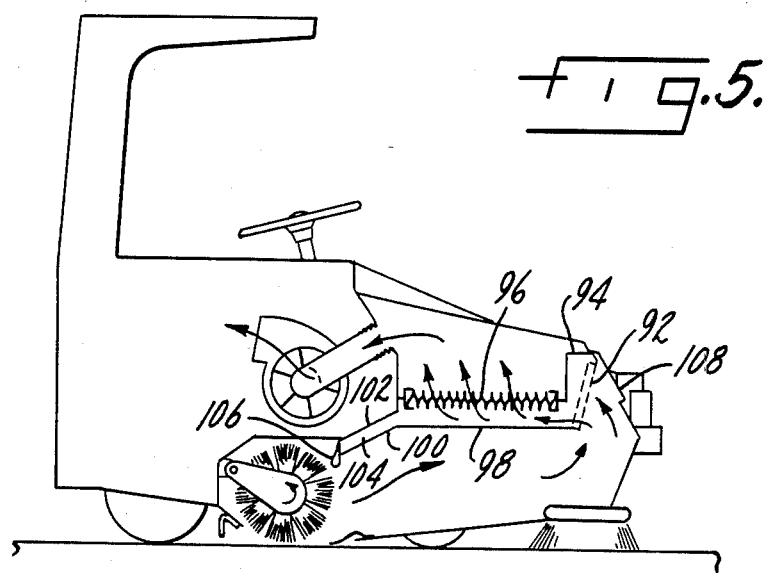
FIG. 5 is a schematic of an alternate form.

In FIG. 1, a sweeper has been shown in outline generally at 10 with a frame 12 on wheels 14 and an engine, not shown, so that it may be self-propelled in a conventional manner. It may be a rider type unit with the operator having a seat or compartment 16 and various controls 18, although various aspects and features of the invention are usable and applicable to other types of units.

A main brush 20 is disposed laterally across the unit and rotates counterclockwise in FIG. 1 so that it propels debris forwardly through an inlet opening 21 into a trash bin or hopper 22 which may be a low dump or high dump unit. In FIG. 1, it is shown generally as a high dump unit. A baffle 24 generally divides the hopper into a lower trash compartment or chamber 26 and an upper filter compartment or chamber 28 which has or houses a suitable filter, diagrammatically indicated at 30, which may be of the pleated paper variety or any one of several other types which are well known in the art. A vacuum fan 32 of any suitable type and size exhausts air from the hopper through a suitable connection 34 which, in this case, is shown at a point remote from the inlet 21 for the hopper. The unit may also have a side or gutter brush 36 which may be conventional. Debris is thrown forward by the brush 20 through the opening 21 in the rear of the hopper so that it collects in the lower compartment 26. A vacuum is created in the hopper by the fan 32 which draws air through the lower opening 21, through the lower compartment 26, through an opening at the forward end of the hopper which has a precleaner 38 and then into the upper compartment 28, through the filter 30 and then exhausted out by the fan 32 at the other end. Suitable walls and/or baffles 39 are provided to direct and control the air so that it passes through the filter. An access door 40 may be provided on the front end for dumping trash and debris from the lower compartment and dust from the upper compartment when the unit is a high dump unit. It will be understood that dust collects on the upper surface of the intermediate baffle 24 which, when a high dump unit is rolled forward, will slide forward and go out through the access door 40 along with the debris from the lower container. In the arrangement shown in FIG. 1 in a high dump unit, the hopper will roll out generally clockwise.

The precleaner 38 in the opening between the debris and filter chambers is made up of or includes lower and upper plates or panels 42 and 44 which are generally parallel to each other, shown in the drawings as more or less horizontal and spaced from each other. Two plates have been shown and will be described, but it should be understood that more than two may be used. Baffle 24 terminates at its forward end in a down bend 46 which serves as a rear mounting for plates 42 and 44 and a terminal lip or flange 48 which directs the air into the precleaner. Lip or flange 48, in a sense, forces the air down so that it enters the precleaner more or less normal thereto. The plates are mounted in a suitable manner such as by screws, welding or otherwise, at their rear edge, as at 50, which is shown as a common mounting but it might be otherwise. The lower plate has down flanges or bends 52 along its longitudinal edges which are shown as secured to the side walls of the hopper at 54 in any suitable manner. Toward their forward edges, the plates are spaced by a suitable stud 56 or the like on each side with the forward edge of the top plate 44 terminating at 58 in a slight down bend. The lower plate 42 terminates in an edge 60 which approaches and/or contacts the front of the hopper. The longitudinal side edges of the upper plate 40 may be also bent down, as at 62 in FIG. 2, if desired.

Each of the plates is provided with a plurality of openings or slots, possibly shown best in FIGS. 3 and 4. In FIG. 3, the slots in the top plate are shown in full and those in the bottom plate are shown in dotted lines. It will be noted that the slots extend longitudinally and are of any given length. As an example, in FIG. 3 the first row of slots 64 in the top plate extend longitudinally with a middle elongated slot and two short slots at each end. The strut 66 between is for strength. The next row 68 has two long slots, with a center rib or strut. The second row 68 is offset from the first row 64 so that there is a panel portion or intervening area 70 between the two rows of slots. And this pattern is repeated across the top plate. In FIG. 4, the top plate 44 is schematically shown with suitable slots or openings 72 in cross section. The bottom plate 42 is of similar or identical construction with the openings or slots 74 being offset relative to the openings in the top plates so that the air flowing through the slots must follow a zig-zag or curvilinear course.

In FIG. 4, the airflows up and the air path are indicated generally by the solid arrows, flowing first through the slots or openings 74 in the lower plate and then through the openings 72 in the upper plate. It will be noted that the panel portions between the slots are wider than the slots and preferably are on the order of 1 to between 1.25 and 1.31. This is to say that for every unit of slot width, there should be 1.25 to 1.31 of panel width. The result is that a panel portion in one plate overlaps both edges of the slot opposite it in the other plate, as indicated at 75. The result is that there is no direct flow path and the air moving through must change course. It is felt that this is important to obtain effective deflection of the air flow.

In addition, the plates are spaced from each other a substantial distance,. In one installation, it was found that something on the order of 1 inch was effective. The point is that if the plates are too closely spaced, a restriction will be effected which will cause high air velocity through the precleaner which is considered undesirable. Thus, the spacing 76 should be such that an unnecessary or excessive restriction does not occur.

Further, the line-of-sight free path between the slots and the plates, indicated at 78, is at an angle to the plates, indicated at 80, which is slightly greater than the angle of repose of conventional dust, indicated at 82.

In contrast to prior devices that rely upon high velocity in an inertial separator, the present device and method relies upon low velocity, combining inertial separation with gravity settling. For example, after passing through an opening 74 in the first plate, the air must make a turn. Due to their inertia, the dust particles tend to be thrown out, as indicated by the arrows 83 in FIG. 4. This will cause the particles to impinge against the back or lower surface 84 of the second plate and accumulate there until a sufficient volume or bulk exists so that it will fall back countercurrent to the airstream through the center of the airstream in the opening 74, to collect on the bottom wall 88 of the hopper. FIG. 4 is only diagrammatic in this respect and the spacing of the bottom wall of the hopper from the precleaner is only illustrative.

In addition, the air must change course again between the plates to go through an opening 72 in the top plate. As before, the dust and dirt tend to be thrown out of the airstream due to inertia, which is indicated at 89. The reduced or low velocity of the air through the device will then allow dust particles to settle on the flat surfaces forming a pile, as at 90. The dust will accumulate until the pile exceeds the angle of repose of normal dirt and dust, thought to be slightly less than about 35°, at which point it will slide or flow down the sides of the pile and fall countercurrent to the airstream, as indicated at 91, to the hopper surface 88.

This combination of inertial and gravity settling is particularly effective when combined with the low velocity of the air movement through the unit which is believed to achieve a balance between gravity separation and inertial separation.

In addition, in FIG. 1 it will be noted that as the air moves from left to right in the lower chamber it must move up and through the precleaner 38, then move right to left in the filter chamber, before passing through the filter 30. The result is that the air and the entrained dust and dirt must reverse course or must turn 180° or thereabouts in entering, moving through, and leaving the precleaner. The heavier particles will be thrown to the outside in this 180° turn. This is also an important part of the separation process, particularly in combination with inertial separation and gravity settling.

Figure 6:
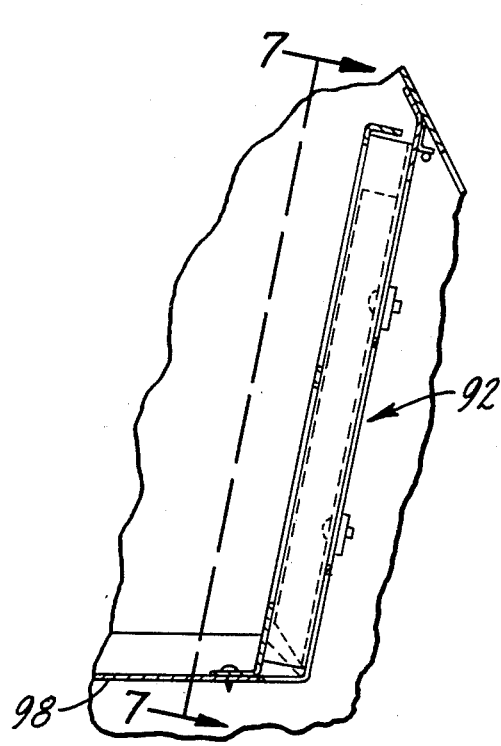
FIG. 6 is an enlargement of a portion of FIG. 5.
Figure 7:
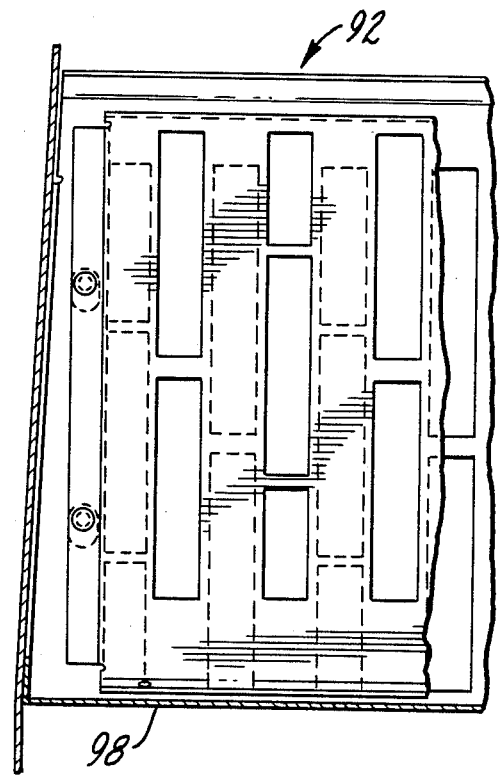
FIG. 7 is a section along line 7—7 of FIG. 6.

The FIG. 1 form is diagrammatic of a high dump unit while FIG. 5 is a low dump unit. Since all of the basic parts and components are or may be the same, they have not been renumbered or repeated. The general arrangement may be considered the same except that the plates or grids of the precleaner 92 have been disposed more or less vertically, as shown enlarged in FIG. 6, with the baffle or plate 94 that seals off the filter element 96 modified somewhat so that the air is directed or must flow through the filter element. Since the details of mounting, the precise bends at the edges of the two plates, the connectors or fasteners, etc. are of no great importance, they have not been described in detail with relation to the FIG., 5-7 form.

The bottom wall or intermediate dividing baffle or plate 98 which separates the lower and upper chambers in the hopper has a rear downslant 100 which is separated from a corresponding wall 102. These two walls provide or define a dust chute 104, which during reverse dumping when the hopper is rotated or tilted some 80° to 90° counterclockwise from the position shown in FIG. 5, causes or allows the dust that has fallen off the filter element 96 on to the wall 98 to slide down the incline 100 to the floor surface. The lower end of passage 104 is suitably sealed as at 106 during operation so that the vacuum is not broken during sweeping. The rear chute 104, seal 106, etc. are conventional and may be as shown generally in U.S. Pat. No. 3,304,572 issued Feb. 21, 1967.

The use, operation and function of the invention are as follows:

Broadly, the invention may be viewed as a sweeper with a hopper having a debris chamber followed by a filter chamber with a precleaner between the two. In addition, it may be viewed as a unit of this general nature with a demisting unit between the chambers because this particular type of precleaner is quite effective in also removing moisture, either alone or in combination with dust and dirt. Added to this is the fact that the particular precleaner or demister shown and described does not create a substantial or difficult restriction in the airflow. This is to say that it is desirable to introduce the air into the filter chamber with little or no pressure drop. And the present unit imposes only a negligible pressure drop.

One of the advantages of the present arrangement when it is viewed as a demister is that sometimes when sweeping out doors, the operator will drive the sweeper through rain puddles and the main brush throws the water and moisture into the hopper. The air flow in turn pulls a certain amount of the moisture which becomes entrained in the airstream into the filter chamber where it will wet and weaken the filter, or cause rot or mildew, thereby causing premature failure. It can also reduce the porosity of the filter by plugging it with mud and debris. The present invention has been found to be very effective in demisting or dewatering the airstream, thereby protecting the filter element and extending its life.

In addition, a large opening is provided into the filter chamber. With the precleaner viewed as a slotted flat sheet panel, be it horizontal or vertical, it will prevent large particles such as bottles, cans and the like from accidentally being thrown up into the filter chamber. Scraps of paper are also effectively stopped. In that sense, it is a screen or grid against larger physical objects.

The precleaner itself is in the nature of two generally parallel panels or plates with slots formed therein and offset relative to each other with an overlap so that a curvilinear airflow is effected. The panel between slots is wider than the slots so that there is an automatic overlap producing the tortuous flow path diagrammatically indicated in FIG. 4. It has been found very effective to have the slot-to-panel ratio on the order of 1:1.25-1.31. It has been found that this will give very effective deflection of the airflow resulting in or giving combined inertial separation and gravity settling. At the same time, the panels are spaced apart a sufficient distance so that an airflow restriction is avoided. In a typical unit, this pressure drop amounted to only 0.1 inches of water which is negligible and in effect constitutes no restriction at all. Also, the precleaner works best with low airflow velocity, for example, 10 feet/second, which may well give the particles an opportunity to settle by gravity, i.e. a settling basin principle. This velocity may be taken as an average velocity, measures as the total airflow in C.F.M. divided by the cross-sectional area in square feet of the sum of all the line-of-sight passages such as 78 in FIG. 4. Separation efficiency falls off if the air velocity gets much above this value.

One of the big advantages of this particular type of precleaner in a unit of this nature is that there are no moving parts, i.e. a static unit. Hence, there are no service problems caused by it.

In addition, the particular location of the precleaner, be it horizontal as in FIG. 1, or essentially vertical as in FIG. 5, is of significance because the combination inertial separation with gravity settling takes place at the same time that the air is turning, or in the process of making a U-turn, i.e. 180° or thereabout. In FIG. 1 where the precleaner is flat or horizontal, the air must turn 90° before entering the first plate. In FIG. 5 where the unit is more or less upright, the air has already gone through something on the order of 150° of turn. Either way, the result is that the heavier particles will be thrown out by centrifugal force.

In addition, the two slotted plates extend all the way across the sweeper so that the air flow into the filter chamber from the debris chamber is widely distributed. This will increase the effectiveness or efficiency of the filter element because flow will be uniform rather than concentrated or eddied.

In a high dump unit, such as diagrammatically shown in FIG. 1, it is preferred that the precleaner be in a generally flat or horizontal disposition. This has the advantage that when the hopper is rolled forward, meaning clockwise in FIG. 1, and the access door 40 will or has been opened, there is a much larger opening in the front of the hopper for the accumulated dust in the filter chamber, for example, on the upper surface of wall 24 in FIG. 1, as well as on the top of the slats in the first plate of the filter, as at 84 in FIG. 4, to flow or fall out the front of the hopper through the access door. Thus, the addition of the precleaner and its relationship to the other components in a unit of the high dump type, as well as possibly others, means that the filter chamber will empty more completely.

In a low dump unit, as diagrammatically shown in FIG. 5, where the baffle plates are almost vertical, there is a similar access door in the front of the hopper, indicated generally at 108 in FIG. 5, which is available for the operator to manually pick up large debris around the machine, such as bottles, cans and what-have-you, open the access door and throw them directly into the lower hopper chamber. There are many objects that are too large to sweep up and the operator must walk around, pick them up and throw them into the hopper. By positioning the precleaner in the particular relation shown in FIG. 5, the access door is available for such an activity.

The particular precleaner, i.e. the slats and slots, their spacing, disposition and geometry, gives both inertial and gravity separation in a reduced velocity unit. In addition, high precision in the manufactured parts and in their positioning etc. is not required. The plates basically may be stampings and their positioning and mounting does not have to be precisely accurate.

While the invention has been shown generally in connection with a forward throw sweeper in FIG. 1, it should be understood that it may be used or applied as well with or on an over-the-top sweeper having a rear hopper.

Further, while only two plates in the precleaner have been shown and described, it should be understood that for certain applications or in certain installations, more than two plates might be used or might be found advantageous or efficient. So the invention should not be and is not limited to two plates.

While the preferred form and several variations of the invention have been shown and suggested and described, it should be understood that suitable additional modifications, changes, substitutions and alterations may be made without departing from the invention's fundamental theme.

We claim:

1. In a sweeper, a mobile frame, wheels for the frame providing for its movement, a generally horizontal rotary brush on the frame adapted to propel debris from a surface to be cleaned, a debris receiving hopper with an inlet opening therein on the frame adapted to receive debris thrown by the brush, two chambers in the hopper, one chamber being a debris chamber for receiving debris from the brush and the other being a filter chamber with a filter unit therein, a vacuum fan on the frame for exhausting air from the hopper and connected to the filter chamber to reduce dusting and to draw air through the filter unit, an opening between the chambers remote from the brush providing for an air flow from the debris chamber to the filter chamber to reduce dusting around the sweeper, and a precleaner for separating some of the dust particles passing through the opening between the debris chamber and the filter chamber constructed and arranged to separate dust particles entrained in the airstream created by the vacuum fan before the airstream enters the filter chamber from the debris chamber, the precleaner including two spaced plates with a series of openings in each plate, the openings in one plate being offset relative to the openings in the other plate, the openings having a smaller dimension than the distance between the openings so that an opening in one plate is overlapped by a plate area in the next plate, thereby requiring the airflow to change direction in flowing from the openings in one plate to and through the openings in the next plate.

2. The structure of claim 1 further characterized in that the openings in the plates are elongated.

3. The structure of claim 1 further characterized in that the precleaner is remote from the inlet opening in the hopper.

4. The structure of claim 1 further characterized in that the plates are generally rectilinear.

5. The structure of claim 1 further characterized in that the plates are disposed generally horizontal.

6. The structure of claim 1 further characterized in that the plates are disposed generally vertical.

7. The structure of claim 1 further characterized in that the line-of-sight free path through the offset openings between the plates is at an angle on the order of 35°.

8. The structure of claim 1 further characterized in that the ratio of the dimensions of the openings relative to the dimensions of the plate areas is on the order of 1 to between 1.25 and 1.31.

9. In a sweeper, a mobile frame, wheels for the frame providing for its movement, a generally horizontal rotary brush on the frame adapted to propel debris from a surface to be cleaned, a debris receiving hopper with an inlet opening therein on the frame adapted to receive debris thrown by the brush, two chambers in the hopper, one chamber being a debris chamber for receiving debris from the brush and the other being a filter chamber with the filter unit therein, a vacuum fan on the frame for exhausting air from the hopper and connected to the filter chamber to reduce dusting and to draw air through the filter unit, an opening between the chambers remote from the brush providing for an air flow from the debris chamber to the filter chamber to reduce dusting around the sweeper, and a precleaner for separating some of the dust particles passing through the opening between the debris chamber and the filter chamber constructed and arranged to separate dust particles entrained in the airstream created by the vacuum fan before the airstream enters the filter chamber from the debris chamber, the precleaner including two generally parallel spaced plates with a series of openings in each plate, the openings in one plate being offset relative to the openings in the next plate, the plates being on the order of one inch apart, the size and spacing of the openings being such that the pressure drop through the precleaner is on the order of 0.1 inch of water.

10. The structure of claim 9 further characterized in that the openings in the plate are elongated.

11. The structure of claim 9 further characterized in that the precleaner is remote from the inlet opening in the hopper.

12. The structure of claim 9 further characterized in that the plates are generally rectilinear.

13. The structure of claim 9 further characterized in that the plates are disposed generally horizontal.

14. The structure of claim 9 further characterized in that the plates are disposed generally vertical.

15. The structure of claim 9 further characterized in that the line-of-sight free path through the offset openings between the plates is at an angle on the order of 35°.

16. The structure of claim 9 further characterized in that the ratio of the dimensions of the openings relative to the dimensions of the plate areas is on the order of 1 to 1.25 and 1.31.

* * * * *